United States Patent [19]

Hughes

[11] 4,028,636

[45] June 7, 1977

[54] ACOUSTO-OPTICAL DEFLECTOR TUNED ORGANIC DYE LASER

[75] Inventor: Richard Swart Hughes, China Lake, Calif.

[73] Assignee: The United States of America as represented by the Secretary of the Navy, Washington, D.C.

[22] Filed: Mar. 8, 1976

[21] Appl. No.: 664,784

Related U.S. Application Data

[63] Continuation of Ser. No. 374,746, June 28, 1973, abandoned.

[52] U.S. Cl. .................. 331/94.5 C; 331/94.5 L; 350/161 W
[51] Int. Cl.² ........................................ H01S 3/10
[58] Field of Search .............. 331/94.5; 350/161 W

[56] References Cited

UNITED STATES PATENTS

| 3,613,024 | 10/1971 | Geusic et al. ............... 331/94.5 |
| 3,684,979 | 8/1972 | Myer et al. ............... 331/94.5 S |

*Primary Examiner*—William L. Sikes
*Attorney, Agent, or Firm*—R. S. Sciascia; Roy Miller; David J. Aston

[57] ABSTRACT

An acousto-optical deflector tuned organic dye laser wherein the tuning element comprises a diffraction grating and a Bragg diffraction cell driven by an RF responsive, ultrasonic transducer. An optional angle multiplier may be used between the cell and the grating.

6 Claims, 1 Drawing Figure

ACOUSTO-OPTICAL DEFLECTOR TUNED ORGANIC DYE LASER

This is a continuation of application Ser. No. 374,746 filed June 28, 1973, now abandoned.

BACKGROUND OF THE INVENTION

The broad band laser emission observed from organic dye lasers provides for a source of continuously tunable coherent radiation. Tuning of a dye laser was first accomplished in 1967 by Soffer and McFarland by replacing the back reflector of the optical resonant cavity with a rotatable diffraction grating. Since that time, other organic dye laser tuning techniques for producing narrow-band laser emission have been devised, most of which have been electromechanical in design.

The disadvantages in using any tuning system that has moving parts, such as a rotatable diffraction grating or electromechanical devices, is the limitation of the operational frequency range. The present invention is a tuning system having no moving parts. That is, tuning is accomplished by employing stationary components, which are an acousto-optical cell and a diffraction grating, and an optional angle multiplier. The laser beam diffraction is responsive to the radio frequency applied to the acousto-optical cell, and the light frequency reflected back into the system by the stationary diffraction grating is dependent on the angle of incidence of the diffracted beam with the grating.

BRIEF DESCRIPTION OF THE DRAWING

The FIGURE is a plan view of the tuning system of the present invention.

DESCRIPTION OF THE PREFERRED EMBODIMENT

Figure 1:
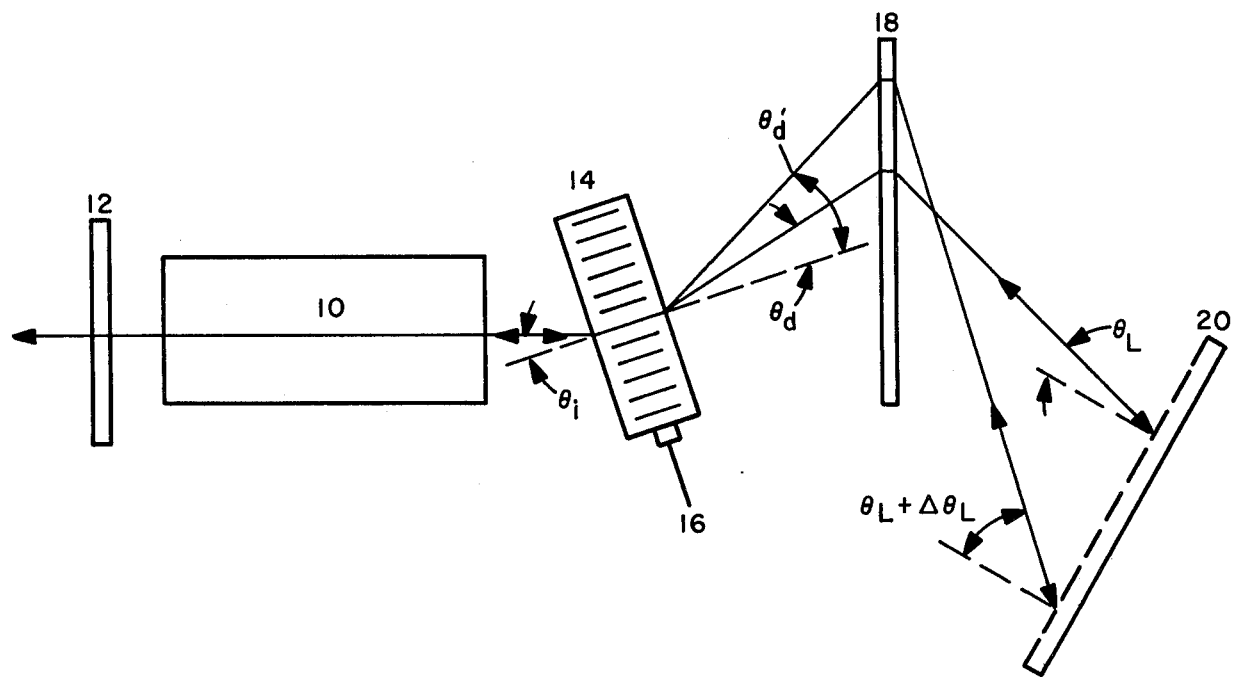

The physical layout of the organic dye laser equipped with the acousto-optic tuning system is shown in the FIGURE. The pump source for the dye laser may be a pulsed nitrogen laser with a variable repetition rate of 0 – 500 pps. The dye laser output mirror 12 may be a 4% reflective quartz flat, and the back mirror 20 a 2160-line/mm diffraction grating. The tuning system includes a Bragg diffraction cell that may be made of Tellurium Dioxide ($TeO_2$).

Electronic tuning is accomplished by an acousto-optic deflection cell 14 and fixed diffraction grating 20 combination. The acousto-optic cell is inserted within the dye laser resonant cavity so that the acoustic wave propagates transversely to the direction of propagation of the optical wave, i.e., in the standard Bragg deflector configuration. Since the dye laser emission wavelength is determined by the angle of incidence of the intracavity beam upon the diffraction grating and since this angle can be varied by varying the acoustic frequency, the output wavelength of the dye laser can be scanned simply by scanning the acousto-optic cell driving frequency. The upper limit of the laser tuning rate is determined by the length of time it takes the acoustical wave to travel across the optical wave. This acoustic transit time is much faster ($\sim 10^2$) than that of the previous geometries.

The preferred embodiment of the laser tuning system of the present invention is shown in the Figure, and includes dye cell 10, output mirror 12, acousto-optic cell 14 having an RF input 16 coupled to its transducer, and diffraction grating 20. Angle multiplier 18, which may consist of a plurality of lenses, may be included to increase the apparent degree of diffraction.

An ultrasonic wave is generated in cell 14 in response to the signal at input 16. When the angle of incidence $\theta_i$ of the cell with respect to the laser axis satisfies the Bragg condition, the beam is transmitted and diffracted by the cell.

The Bragg condition is:

$$2 \sin\theta_i = \lambda f/v$$

where:
- $\theta$ is the angle of incidence
- $\lambda$ is the laser wavelength, and
- $f$ and $v$ are the frequency and velocity, respectively, of the acoustic wave within the cell.

The angle of diffraction, $\theta_d$, and angle of incidence, $\theta_i$, should be equal to avoid destructive interference. Therefore, $2 \sin\theta_d = \lambda f/v$. For small angles $\sin\theta_d \simeq \theta_d$. As a result, for small angles $2\theta_d$ can be taken as equal to $\lambda f/v$, i.e., $2\theta_d = \lambda f/v$.

Changes, $\Delta$, in the diffraction angle $\theta_d$ can be written as $\Delta\theta_d$. And, when the change in the diffraction angle is applied to the Bragg condition, the condition becomes $$\Delta(2\theta_d) = \Delta(\lambda f)/v = 1/v [\lambda\Delta f + f\Delta\lambda]$$

where we assume that $v$ is a constant over the range of frequencies ($f + \Delta f$).

At a specific angle of incidence $\theta_i$ the Bragg condition is satisfied for a given laser wavelength $\lambda$, and a given acoustic frequency $f$. As the acoustic frequency $f$ is changed there is a change in the diffraction angle $\theta_d$. But, the change in diffraction angle $\theta_d$ is accompanied by a change in $\lambda$. The change in $\lambda$ is due to the change in the reflection angle $\theta_L$ of the diffraction grating 20. As a result, there is an interaction taking place due to both variables $\lambda$ and $\theta$.

Diffraction grating 20 is applied in the Littrow configuration and is employed as a reflective element of the resonant cavity. For each angle-of-incidence that light impinges on grating 20, the grating reflectively returns a wavelength back along the path from which it came. So, if multi-chromatic light impinges on grating 20 at a specific, relatively high angle-of-incidence, a specific wavelength will be returned, assuming it is present in the beam of incident light. And, if it impinges at a specific, low angle-of-incidence, a different specific wavelength will likewise be returned. Thereby, diffraction grating 20 acts as a wavelength selecting means by reversing the direction of a wavelength, with the wavelength reversed being determined by the angle-of-incidence of the light on the grating. That is, diffraction grating is retrogressively reflective to a wavelength that impinges at its retrogressive angle-of-incidence.

The angular dispersion of a diffraction grating used in the Littrow configuration, which is used in the present invention, is given by:

$$\Delta\theta_L = 2/\lambda \tan\theta_L \Delta\lambda$$

As can be seen from the drawing, $\Delta\theta_L$ is equal to $\Delta(2\theta_d)$ times the angular multiplication factor M of angle multiplier 18. That is, $$M \Delta(2\theta_d) = \frac{2}{\lambda} \tan\theta_L (\Delta\lambda).$$

-continued $$\Delta\lambda = \frac{\lambda M \, \Delta(2\theta_d)}{2 \tan \theta_L}.$$

From the equations given above it can be shown that $$\Delta(2\theta_d) = \frac{1}{v}\left[\Delta\lambda f + \frac{f\lambda M \, \Delta(2\theta_d)}{2 \tan \theta_L}\right].$$

Solving for $\Delta(2\theta_d)$, we have $$\Delta(2\theta_d) = \lambda \Delta f/v \left[\frac{1}{1 - \frac{f\lambda M}{2 v \tan \theta_L}}\right]$$

From the Bragg condition we know that a change in the acoustic frequency $f$ changes the deflection angle $\theta_d$. The deflection angle is multiplied by angle multiplier 18, if included, and changes the angle of incidence or reflection, $\theta_L$, on diffraction grating 20. Since the angle of incidence or reflection $\theta_L$ upon diffraction grating 20, determines the lasing wavelength, a change in the signal applied to input 16 results in a change in the dye laser emission wavelength $\lambda$. That is, the laser is tunable by varying the RF signal input.

The transverse acousto-optic tuned dye laser of the present invention provides for a rapidly, reproducibly, and continuously tuned source of coherent radiation. Because of the very short acoustic transit time ($10^{-6}$ sec) inherent to the transverse geometry, high tuning rates can be achieved. Obviously, to take full advantage of the high tuning rate, a high PRF pump laser is necessary. This sytem (even without an angle multiplier) will provide for a tuning range exceeding the range over which almost all dyes can be tuned.

What is claimed is:

1. A laser tuning system comprising:
   a laser cavity having two ends and including a laser cell emitting a band of laser light frequencies;
   a laser output mirror bounding one end of said cavity;
   an acousto-optic diffraction cell positioned in said laser cavity to diffract said laser light at an angle of diffraction;
   means connected to said acousto-optic diffraction cell for controlling the angle of diffraction of the laser light; and
   means at the other end of said laser cavity for retroreflecting, in response to said angle of diffraction, only one frequency of said band of laser light frequencies.

2. The system of claim 1 wherein said acousto-optic diffraction cell is oriented at the Bragg angle to said laser light.

3. The system of claim 1 wherein said retroreflecting means is a reflective diffraction grating.

4. The system of claim 3 wherein said system further includes means positioned between said cell and said grating for increasing the angular diffraction of the beam.

5. The system of claim 4 wherein said angular increasing means is an angle multiplier lens system.

6. The system of claim 5 wherein said laser is an organic dye laser.

* * * * *